(12) United States Patent
Wisnewski et al.

(10) Patent No.: US 9,627,937 B2
(45) Date of Patent: Apr. 18, 2017

(54) STATOR FOR AN ELECTRIC MOTOR

(71) Applicant: GM GLOBAL TECHNOLOGY OPERATIONS LLC, Detroit, MI (US)

(72) Inventors: Mark A. Wisnewski, Stockbridge, MI (US); David J. Trzcinski, Howell, MI (US); William T. Ivan, Shelby Township, MI (US); Yue Fan, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 497 days.

(21) Appl. No.: 14/093,752

(22) Filed: Dec. 2, 2013

(65) Prior Publication Data

US 2015/0155752 A1    Jun. 4, 2015

(51) Int. Cl.
H02K 3/34    (2006.01)
H02K 3/30    (2006.01)
H02K 3/32    (2006.01)

(52) U.S. Cl.
CPC ............ H02K 3/345 (2013.01); H02K 3/30 (2013.01); H02K 3/325 (2013.01)

(58) Field of Classification Search
CPC  H02K 3/30; H02K 3/34; H02K 3/345; H02K 3/40
See application file for complete search history.

(56) References Cited

U.S. PATENT DOCUMENTS

| | | | |
|---|---|---|---|
| 3,990,029 A * | 11/1976 | Kano | H02K 3/40 335/297 |
| 4,327,246 A | 4/1982 | Kincaid | |
| 5,030,870 A * | 7/1991 | Wichmann | H02K 3/48 310/179 |
| 5,982,056 A * | 11/1999 | Koyama | C08G 59/38 310/216.001 |
| 6,150,747 A | 11/2000 | Smith et al. | |
| 6,621,373 B1 | 9/2003 | Mullen et al. | |
| 6,998,538 B1 | 2/2006 | Fetterolf, Sr. et al. | |
| 7,205,480 B2 | 4/2007 | Fetterolf, Sr. et al. | |
| 8,287,965 B2 * | 10/2012 | Aoki | H02K 3/40 118/317 |
| 2010/0215844 A1 * | 8/2010 | Aoki | H02K 15/12 427/104 |

FOREIGN PATENT DOCUMENTS

JP    2011239534 A  *  11/2011

* cited by examiner

Primary Examiner — Tran Nguyen

(57) ABSTRACT

A stator for an electric motor includes a plurality of pole pieces and a plurality of electrical windings associated with the pole pieces. Each winding includes a cable having an electrically conductive element. A lossy insulative material is located between the electrical windings and the associated pole pieces.

9 Claims, 2 Drawing Sheets

STATOR FOR AN ELECTRIC MOTOR

TECHNICAL FIELD

This disclosure is related to electric motors.

BACKGROUND

The statements in this section merely provide background information related to the present disclosure. Accordingly, such statements are not intended to constitute an admission of prior art.

An electric motor includes electrically conductive windings and a structure or frame to support the windings and magnets, when employed. In operation, stray capacitance can be generated between adjacent wires and between wires and the structure. Such stray capacitances include a parallel resistance element consisting of insulative material and air. In operation, a motor causes a rotor element to rotate in response to electrical current switching caused by a motor controller, which leads to high frequency ringing in the common mode at each rising edge and each falling edge of the motor controller output. The motor controller system contains a small parallel resistance. The high frequency ringing has repeatable and measureable characteristics including frequency, magnitude and duration that are directly related to the system resistance and stray capacitance/parallel resistance both between adjacent wires and between wires and the structure.

A parasitic or stray capacitance develops in an electric circuit between circuit components due to their proximity. A magnitude of energy loss can be determined in relation to electric frequency. Proximate conductors are affected by each others' electric fields, with an electric power loss, i.e., parasitic loss, directly proportional to frequency of the current. Parasitic capacitance can cause objectionable high frequency ringing, reduce motor torque output and/or increase power consumption.

SUMMARY

A stator for an electric motor includes a plurality of pole pieces and a plurality of electrical windings associated with the pole pieces. Each winding includes a cable having an electrically conductive element. A lossy insulative material is located between the electrical windings and the associated pole pieces.

BRIEF DESCRIPTION OF THE DRAWINGS

One or more embodiments will now be described, by way of example, with reference to the accompanying drawings, in which.

DETAILED DESCRIPTION

Figure 1A:
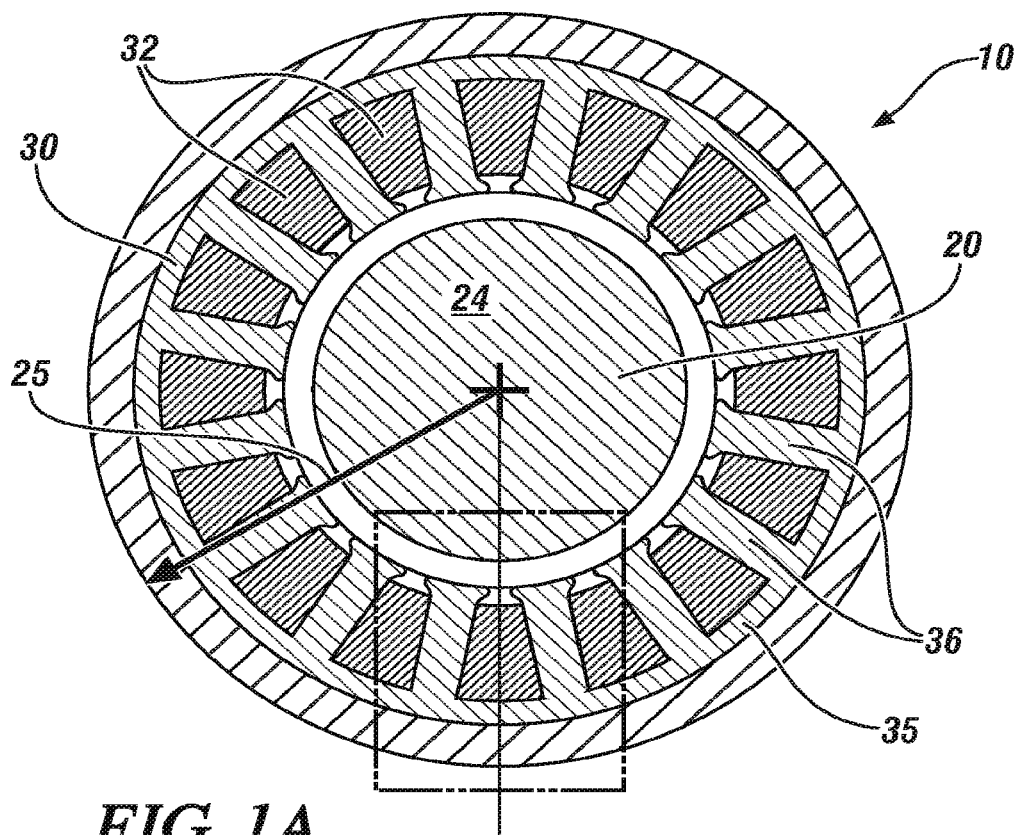
FIGS. 1A, 1B and 1C illustrate elements of an embodiment of an electric motor, in accordance with the disclosure.
Figure 1B:
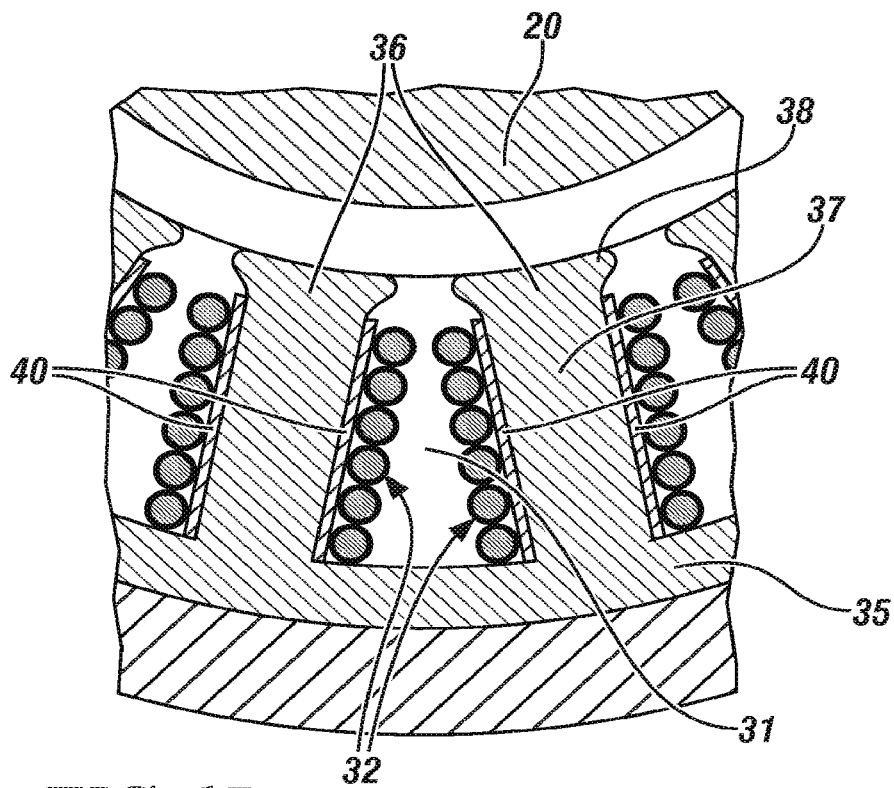
Figure 1C:
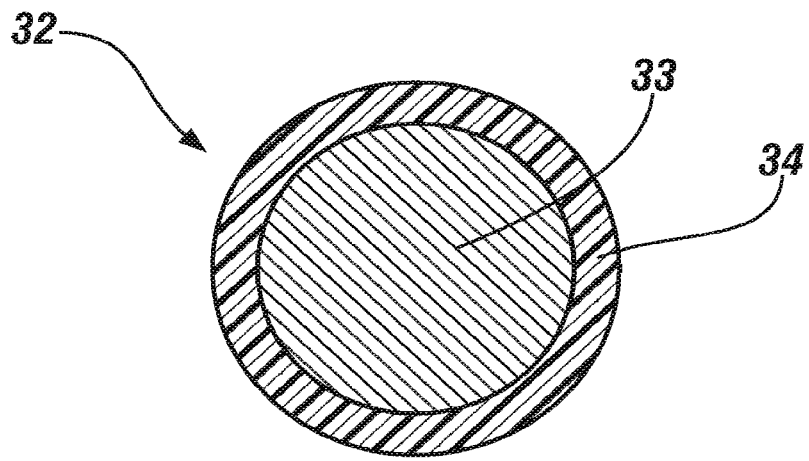

Referring now to the drawings, wherein the showings are for the purpose of illustrating certain exemplary embodiments only and not for the purpose of limiting the same, FIGS. 1A, 1B and 1C schematically illustrate elements of an electric motor 10, shown with reference to a longitudinal axis 24 (into the page) and radial axis 25. The embodiment of the electric motor 10 includes an internal rotor 20 configured to rotate about the longitudinal axis 24 within a radially concentric external stator 30. The stator 30 includes a plurality of radially-oriented pole pieces 36 that connect to and are supported by an outer circumferential stator base 35 that are formed from an electromagnetic material, e.g., a ferromagnetic material. The stator 30 can be formed using any suitable process, including, e.g., machining, casting, assembling of pre-cast or pre-machined elements and assembling of insulated stamped elements. Adjacent pairs of the pole pieces 36 form slots 31 into which windings 32 are inserted. The electric motor 10 electrically connects to a motor controller including a power inverter that controls its operation. Other details of the electric motor 10 are omitted for clarity. The embodiment of the electric motor 10 is illustrative, and the concepts described herein apply to other electric motor configurations without limitation.

FIG. 1B illustrates details of one of the adjacent pairs of the pole pieces 36 forming one of the slots 31 of the rotor 20. Each of the pole pieces 36 includes a radial portion 37 that emerges radially from the stator base 35 and a head portion 38. Winding 32 is inserted within each slot 31 adjacent to the radial portion 37 of each of the pole pieces 36. FIG. 1C schematically shows winding 32 including electrically conductive cable 33 coated with wire insulating material 34 that is arranged in a suitable configuration to effect motor operation. The wire insulating material 34 can be any suitable wire insulating material, e.g., varnish.

A lossy insulator 40 is preferably placed between the winding 32 and the adjacent radial portion 37 of each of the pole pieces 36. The lossy insulator may also be placed between the winding 32 and the valley surface of the stator base 35 located between adjacent pole pieces 36. In fact, such valley placement may simply result from manufacturing processes. In one embodiment, the lossy insulator 40 is applied onto the radial portion 37 of each of the pole pieces 36 as a liquid coating that is cured in place. The lossy insulator 40 is applied and cured employing film deposition, plating, dipping brushing, spraying, or another suitable coating methodology that can determined based upon material characteristics of the lossy insulator 40. Alternatively or in addition, the lossy insulator 40 can be combined with a suitable binding material and formed into a sheet that is pre-cut, formed and inserted into each of the slots 31 between the pole pieces 36 and the windings 32 prior to or coincident with inserting of the windings 32 into the slots 31. In one embodiment, the lossy insulator 40 is applied onto the electrically conductive cable 33 of the winding 32 overtop the insulating material 34 of the cable 33. In one embodiment, the lossy insulator 40 is combined with the insulating material 34 and coincidently applied onto the electrically conductive cable 33 of the winding 32.

The action of the motor controller operating the electric motor 10 produces electromagnetic energy referred to as ringing, which has repeatable and measureable characteristics including frequency, magnitude and duration. The frequency, magnitude and duration of the ringing directly relate to the system resistance, stray capacitance, and series resistance in the electric motor 10, including wire-to-wire and wire-to-structure connections.

The lossy insulator 40 includes an electrically insulative material that suppresses transmission of electromagnetic energy between conductive elements by dissipating electrical energy. The electrical energy is dissipated by introducing a shunt resistance provided by the lossy insulator 40, which is a controlled resistance that reduces the effects of the parasitic capacitances between the windings and the pole pieces, and any winding capacitance. The controlled resistance of the lossy material in series with parasitic capacitances increases the dissipation of unwanted energy passing through capacitance while also decreasing the total parasitic capacitance due to includes distance between the winding and the stator, thus reducing ringing and interference. The lossy insulator 40 provides a low magnitude shunt resistance between adjacent conductive cables 33 of the winding 32 and between the conductive cables 33 of the winding 32 and the pole pieces 36. There may still be original parasitic capacitance in series, in the form of small air gaps and enamel insulation on the conductive cables 33.

The material of the lossy insulator 40 is an electrically resistive material that suppresses transmission of electromagnetic energy between conductive elements by dissipating electromagnetic energy. The electrically insulative material prevents or limits the flow of electrons across their surface or through their volume. Electrically insulative materials have a high electrical resistance and may be difficult to electrically ground to a case ground or other electrical ground. The material of the lossy insulator 40 is formed from materials that include one or more of carbon, metal film, polymer and semiconductor material. Exemplary conductive elements include the winding 32 and the adjacent radial portion 37 of each of the pole pieces 36, which can be considered analogous to the plates of a capacitor. The insulative property of the lossy insulator 40 can be selected to override the air resistance in the circuit, and can dampen high frequency ringing to low amplitude when selected to match the system resistance.

The lossy insulator 40 preferably has a specific bulk resistance that loads an equivalent electric resonance circuit created by the inductance and capacitance of the circuit to a critically damped or overdamped condition. Thus, in one embodiment the bulk resistance is in the range between less than one ohm and fifty ohms in a system having a parasitic capacitance range that is between less than one hundred picofarads (pF) and three thousand picofarads. The effect of the lossy insulator 40 is to reduce ringing that occurs due to inverter-induced switching causing the capacitance between the winding and the pole piece to charge or discharge. Thus, the lossy insulator 40 reduces electromagnetic interference caused by motor ringing that occurs due to switching. The magnitude of shunt resistance provided by the lossy insulator 40 is preferably determined by monitoring inductive ringing in a target application and monitoring system response due to its geometry.

Figure 2:
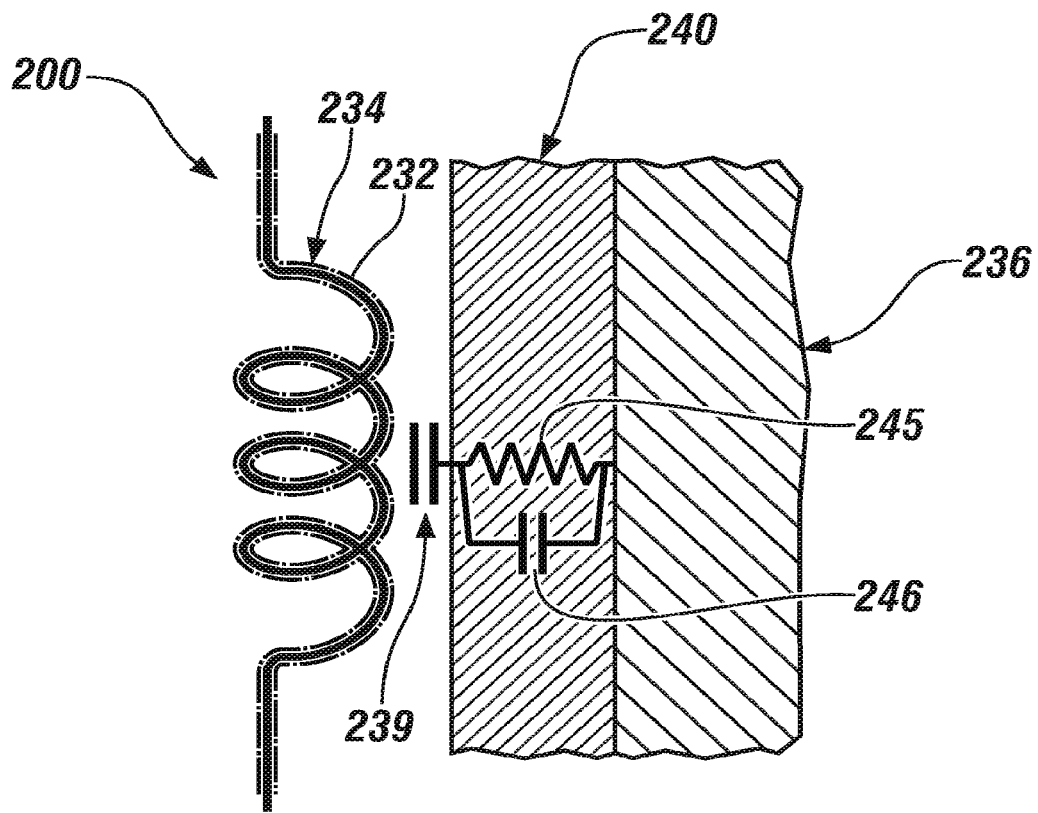
FIG. 2 illustrates an electric circuit for modeling electrical characteristics of an electrical motor to determine preferred electrical characteristics of lossy insulative material, in accordance with the disclosure.

FIG. 2 schematically illustrates an equivalent electric resonance circuit 200 that can be employed in modeling electrical characteristics of an electrical motor to determine preferred electrical characteristics of the lossy insulative material for a target application. The electric resonance circuit 200 comprehends electrical interaction including parasitic capacitance 239 between a pole piece 236 of a stator and an adjacent winding 232 including wire insulative material 234 in an electric motor. The winding 232 and electrically connected motor controller, energy source, and electrical filtering system behave as a combination of resistance, capacitance, and inductance, and is susceptible to common mode electrical resonance when excited by current through the parasitic capacitance 239. The pole piece 236 includes the lossy insulative material 240 characterized in terms of a resistance 245 in parallel with a capacitance 246. The parasitic capacitance 239 between the winding 232 and the pole piece 236 causes electric power losses that are resistive in nature due to voltage drop of the conduction current or displacement current in the electric field. Thus, the resistance of the lossy insulative material 240 is preferably selected to minimize the electric power losses at critical frequencies, which may be related to a system operating frequency or a maximum achievable frequency.

The electric resonance circuit 200 in connection with electrical components of the motor controller and motor mounting chassis form a series RLC circuit in the common mode, causing a resonating voltage potential between a DC bus that supplies electric power to the controller. A lossy material resistance value can be determined employing a maximum power transfer theorem. The maximum power transfer theorem states that to obtain maximum external power from a source with a finite internal resistance the resistance of the load must equal the resistance of the source as viewed from its output terminals. Thus, the lossy material resistance value must be equivalent to the impedance of the electric motor in order to dissipate the most power in circuit 200 such that unwanted electrical energy in the common mode is transferred into heat rather than noise signals that can be coupled by proximity in a near field as oscillating magnetic or electric fields or radiated in a far field as electromagnetic waves. This method can be practically applied by determining a total motor impedance that is produced during operation of a representative motor operating at a dominant frequency without the lossy material resistance, and employing the determined total impedance. Alternatively, the lossy material resistance value can be determined employing impedance matching to prevent electrical reflections in embodiments wherein the characteristic impedance of the circuit remains the same throughout the electrical path. This method is practically applied when a single characteristic impedance exists that is not frequency-dependent.

Thus, a parasitic capacitance is formed when wires or windings are wound over the motor pole pieces. This parasitic capacitance draws current that contributes to ringing and conducted interference. Adding a series resistance in the form of a lossy insulator to increase the loss of the capacitance reduces ringing and interference. Adding the series resistance can be effected by applying lossy material to the surface of the wire forming the windings and/or to the pole piece decreases the current due to parasitic winding capacitance. The lossy insulator is described with reference to application on an electric motor. Other suitable applications include by way of example solenoids, relays, linear motors, and other electrical devices/applications having stray capacitance between a wire coil and a pole piece.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An electric motor system, comprising:
   a stator comprising a plurality of pole pieces;
   a plurality of electrical windings associated with the pole pieces, each winding comprising a cable including an electrically conductive element; and
   a lossy insulative material located between the electrical windings and the associated pole pieces wherein the lossy insulative material comprises an electrically insulative material having a bulk resistance that electrically loads an equivalent electric resonance circuit comprising a parasitic capacitance between said pole pieces and said electrical windings to one of a critically damped or an overdamped condition.

2. The stator of claim 1, wherein the lossy insulative material has a bulk resistance between a fraction of an ohm and 50 ohms when the electric resonance circuit has a parasitic capacitance range that is between one hundred picofarads and three thousand picofarads.

3. The stator of claim 1, wherein the lossy insulative material comprises one or more of carbon, metal film, polymer and semiconductor materials.

4. The stator of claim 2, wherein the lossy insulative material located between the electrical windings and the associated pole pieces comprises the lossy insulative material applied to the pole piece.

5. The stator of claim 2, wherein the lossy insulative material located between the electrical windings and the associated pole pieces comprises the lossy insulative material applied to the electrical windings.

6. The stator of claim 2, wherein the lossy insulative material located between the electrical windings and the associated pole pieces comprises the lossy insulative material combined with a binding material, formed into a sheet and inserted into each of the slots between the electrical windings and the associated pole pieces.

7. An electric motor system, comprising:
a stator comprising plurality of pole pieces, each pole piece comprising a ferromagnetic material coated with a lossy insulative material; and
a plurality of electrical windings associated with the pole pieces, each winding comprising a cable, said cable comprising an electrically conductive element coated with an insulative sheath comprising the lossy insulative material wherein the lossy insulative material comprises an electrically insulative material having a bulk resistance that electrically loads an equivalent electric resonance circuit comprising a parasitic capacitance between said pole pieces and said electrical windings to one of a critically damped or an overdamped condition.

8. The stator of claim 7, wherein the lossy insulative material has a bulk resistance between a fraction of an ohm and 50 ohms when the electric resonance circuit has a parasitic capacitance range that is between one hundred picofarads and three thousand picofarads.

9. The stator of claim 7, wherein the lossy insulative material comprises one or more of carbon, metal film, polymer and semiconductor materials.

* * * * *